United States Patent
Peddinti et al.

(10) Patent No.: US 12,462,788 B2
(45) Date of Patent: Nov. 4, 2025

(54) INSTANTANEOUS LEARNING IN TEXT-TO-SPEECH DURING DIALOG

(71) Applicant: Google LLC, Mountain View, CA (US)

(72) Inventors: Vijayaditya Peddinti, San Jose, CA (US); Bhuvana Ramabhadran, Mt. Kisco, NY (US); Andrew Rosenberg, Brooklyn, NY (US); Mateusz Golebiewski, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/312,576

(22) Filed: May 4, 2023

(65) Prior Publication Data

US 2023/0274727 A1    Aug. 31, 2023

Related U.S. Application Data

(63) Continuation of application No. 17/190,456, filed on Mar. 3, 2021, now Pat. No. 11,676,572.

(51) Int. Cl.
  *G10L 17/02*    (2013.01)
  *G10L 13/08*    (2013.01)
  *G10L 15/187*   (2013.01)

(52) U.S. Cl.
  CPC .......... *G10L 13/08* (2013.01); *G10L 15/187* (2013.01)

(58) Field of Classification Search
  None
  See application file for complete search history.

(56) References Cited

U.S. PATENT DOCUMENTS

| 5,766,015 A * | 6/1998 | Shpiro ............ G09B 19/06 434/156 |
| 6,249,763 B1 * | 6/2001 | Minematsu ........ G10L 15/07 704/254 |

(Continued)

FOREIGN PATENT DOCUMENTS

| JP | H11175082 A | 7/1999 |
| JP | 2001159865 A | 6/2001 |

OTHER PUBLICATIONS

International Search Report and Written Opinion for the related Application No. PCT/US2021/018219, dated May 31, 2022, 68 pages.

(Continued)

*Primary Examiner* — Jakieda R Jackson
(74) *Attorney, Agent, or Firm* — Honigman LLP; Brett A. Krueger; Grant Griffith

(57) ABSTRACT

A method for instantaneous learning in text-to-speech (TTS) during dialog includes receiving a user pronunciation of a particular word present in a query spoken by a user. The method also includes receiving a TTS pronunciation of the same particular word that is present in a TTS input where the TTS pronunciation of the particular word is different than the user pronunciation of the particular word. The method also includes obtaining user pronunciation-related features and TTS pronunciation related features associated with the particular word. The method also includes generating a pronunciation decision selecting one of the user pronunciation or the TTS pronunciation of the particular word that is associated with a highest confidence. The method also include providing the TTS audio that includes a synthesized speech representation of the response to the query using the user pronunciation or the TTS pronunciation for the particular word.

18 Claims, 6 Drawing Sheets

(56) References Cited

U.S. PATENT DOCUMENTS

| | | | |
|---|---|---|---|
| 7,280,963 B1* | 10/2007 | Beaufays | G10L 15/187 |
| | | | 704/E15.02 |
| 10,319,365 B1* | 6/2019 | Nicolis | G10L 15/26 |
| 10,339,920 B2* | 7/2019 | Adams | G10L 15/08 |
| 10,403,291 B2* | 9/2019 | Moreno | G10L 17/14 |
| 11,546,390 B1* | 1/2023 | Boodaei | H04N 7/15 |
| 2002/0082831 A1* | 6/2002 | Hwang | G10L 15/063 |
| | | | 704/249 |
| 2002/0118846 A1* | 8/2002 | Narusawa | G10L 21/0364 |
| | | | 381/103 |
| 2002/0146669 A1* | 10/2002 | Bender | G09B 17/003 |
| | | | 434/178 |
| 2004/0230431 A1* | 11/2004 | Gupta | G09B 19/06 |
| | | | 704/254 |
| 2005/0273337 A1 | 12/2005 | Erell et al. | |
| 2007/0233487 A1* | 10/2007 | Cohen | G10L 15/063 |
| | | | 704/255 |
| 2010/0153115 A1* | 6/2010 | Klee | G10L 13/08 |
| | | | 704/260 |
| 2011/0218806 A1 | 9/2011 | Alewine et al. | |
| 2013/0277915 A1* | 10/2013 | Garrett | A63F 1/02 |
| | | | 273/293 |
| 2014/0234809 A1* | 8/2014 | Colvard | G09B 17/006 |
| | | | 434/169 |
| 2014/0365216 A1* | 12/2014 | Gruber | G10L 13/027 |
| | | | 704/235 |
| 2014/0379709 A1* | 12/2014 | Mack | G10L 13/08 |
| | | | 707/732 |
| 2015/0161985 A1* | 6/2015 | Peng | G10L 15/26 |
| | | | 704/235 |
| 2015/0206539 A1* | 7/2015 | Campbell | G10L 17/22 |
| | | | 704/251 |
| 2015/0243278 A1* | 8/2015 | Kibre | G10L 15/187 |
| | | | 704/243 |
| 2015/0364141 A1* | 12/2015 | Lee | G06F 3/167 |
| | | | 704/235 |
| 2016/0188727 A1* | 6/2016 | Waibel | G06F 16/9535 |
| | | | 707/758 |
| 2016/0307569 A1 | 10/2016 | Peng et al. | |
| 2017/0130465 A1* | 5/2017 | Claudin | E04F 15/02183 |
| 2017/0178619 A1 | 6/2017 | Naik et al. | |
| 2018/0130465 A1* | 5/2018 | Kim | G06F 40/284 |
| 2018/0174483 A1* | 6/2018 | Bhunachet | G10K 11/20 |
| 2018/0190269 A1* | 7/2018 | Lokeswarappa | G09B 19/06 |
| 2020/0228336 A1* | 7/2020 | Streit | H04L 9/008 |
| 2020/0357390 A1* | 11/2020 | Bromand | G10L 13/08 |
| 2021/0099759 A1* | 4/2021 | Armstrong | H04N 21/6582 |
| 2023/0083096 A1* | 3/2023 | Trehan | G06N 20/00 |
| | | | 706/12 |
| 2023/0162731 A1* | 5/2023 | Wu | G10L 15/187 |
| | | | 704/275 |
| 2024/0193193 A1* | 6/2024 | Hattori | G06F 16/3344 |

OTHER PUBLICATIONS

Japanese Office Action for the related Application No. 2024-151468 dated Sep. 2, 2025.

\* cited by examiner

INSTANTANEOUS LEARNING IN TEXT-TO-SPEECH DURING DIALOG

CROSS-REFERENCE TO RELATED APPLICATIONS

This patent application is a continuation of, and claims priority under 35 U.S.C. § 120 from, U.S. patent application Ser. No. 17/190,456, filed on Mar. 3, 2021. The disclosure of this prior application is considered part of the disclosure of this application and is hereby incorporated by reference in its entirety.

TECHNICAL FIELD

This disclosure relates to instantaneous learning in text-to-speech during dialog.

BACKGROUND

Users frequently interact with voice-enabled devices, such as smart phones, smart watches, and smart speakers, through digital assistants. These digital assistants provide a dialog with the users to enable the users to complete tasks and obtain answers to questions they have all through natural, conversational interactions. Ideally, during a dialog between a user and the digital assistant, the user should be able to communicate as if the user were talking to another person, via spoken queries directed toward their voice-enabled device running the digital assistant. The digital assistant will provide these spoken queries to an automated speech recognizer (ASR) system to process and recognize the spoken request so that an action can be performed. Additionally, the digital assistant will also employ a text-to-speech (TTS) system to convert textual representations of responses to the query into synthesized speech for audible output from the user's voice-enabled device. Often, there is overlap in the vocabulary between spoken queries and corresponding TTS responses during a digital assistant dialog, whereby a user pronunciation of a word in a spoken query is different than a TTS pronunciation of the same word present in a digital assistant response to the query when audibly output as synthesized speech.

SUMMARY

One aspect of the disclosure provides a computer-implemented method that when executed on data processing hardware causes the data processing hardware to perform operations for selecting which one of a user pronunciation of a particular word or a text-to-speech pronunciation of the particular word is more reliable for use in text-to-speech audio. The operations include receiving a user pronunciation of a particular word present in a query spoken by a user. The operations also include receiving a text-to-speech (TTS) pronunciation of the same particular word that is present in a TTS input. The TTS input includes a textual representation of a response to the query and the TTS pronunciation of the particular word is different than the user pronunciation of the particular word. The operations also include obtaining user pronunciation-related features associated with the user pronunciation of the particular word and obtaining TTS pronunciation-related features associated with the TTS pronunciation of the particular word. The operations also include generating, as output from a pronunciation decision model configured to receive the user pronunciation-related features and the TTS pronunciation-related features as input, a pronunciation decision selecting the one of the user pronunciation of the particular word or the TTS pronunciation of the particular word that is associated with a highest confidence for use in TTS audio. The operations also include providing, for audible output from a user device associated with the user, the TTS audio that includes a synthesized speech representation of the response to the query using the one of the user pronunciation for the particular word or the TTS pronunciation for the particular word that was selected by the pronunciation decision output from the pronunciation decision model.

Implementations of the disclosure may include one or more of the following optional features. In some implementations, the operations further include receiving audio data that corresponds to the query spoken by the user and processing, using an automated speech recognizer (ASR), the audio data to generate a transcription of the query. In these implementations, receiving the user pronunciation of the particular word includes at least one of: extracting the user pronunciation of the particular word from an intermittent state of the ASR while using the ASR to process the audio data; extracting a user acoustic representation of the particular word from the audio data that conveys the user pronunciation of the particular word; or processing the audio data to generate a user phoneme representation that conveys the user pronunciation of the particular word. The user pronunciation-related features associated with the user pronunciation of the particular word may also include one or more confidence features associated with the ASR recognizing the particular word in the audio data.

In some examples, the user pronunciation-related features associated with the user pronunciation of the particular word include at least one of a geographical area of the user when the query was spoken by the user, linguistic demographic information associated with the user, or a frequency of using the user pronunciation when pronouncing the particular word in previous queries spoken by the user and/or other users. Receiving the TTS pronunciation of the particular word may include: receiving, as input to a TTS system, the TTS input that includes a textual representation of the response to the query; generating, as output from the TTS system, an initial sample of TTS audio that includes an initial synthesized speech representation of the response to the query; and extracting a TTS acoustic representation of the particular word from the initial sample of the TTS audio, the TTS acoustic representation conveys the TTS pronunciation of the particular word.

Optionally, receiving the TTS pronunciation of the particular word may include processing the textual representation of the response to the query to generate a TTS phoneme representation that conveys the TTS pronunciation of the particular word. In some examples, the TTS pronunciation-related features associated with the TTS pronunciation of the particular word includes at least one of a verified preferred pronunciation for the particular word, an unverified pronunciation for the particular word estimated using pronunciation mining form one or more auxiliary information sources, a pronunciation variant feature that indicates whether any other variants for pronouncing the particular word exists, or a pronunciation complexity feature that indicates a likelihood of user mispronunciation of the particular word.

In some implementations, after generating the pronunciation decision selecting the one of the user pronunciation of the particular word or the TTS pronunciation of the particular word, the operations further include receiving explicit feedback from the user that indicates which one of the user pronunciation of the particular word or the TTS pronunciation of the particular word the user prefers for pronouncing the particular word in subsequent TTS outputs and updating the pronunciation decision model based on the explicit feedback from the user. Here, when the explicit feedback from the user indicates that the user prefers the user pronunciation of the particular word, the operations further include updating a TTS system to use the user pronunciation of the particular word when generating TTS audio that includes the particular word. In some examples, after providing the TTS audio for audible output from the user device, the operations further include receiving audio data that corresponds to a subsequent query spoken by the user or another user that includes the particular word, determining implicit user feedback that indicates whether or not the user or the other user pronounced the particular word in the subsequent query the same as the one of the user pronunciation for the particular word or the TTS pronunciation for the particular word that was selected by the pronunciation decision, and updating the pronunciation decision model based on the implicit user feedback.

Another aspect of the disclosure provides a system that includes data processing hardware in communication with the data processing hardware and storing instructions that when executed on the data processing hardware cause the data processing hardware to perform operations for selecting which one of a user pronunciation of a particular word or a text-to-speech pronunciation of the particular word is more reliable for use in text-to-speech audio. The operations include receiving a user pronunciation of a particular word present in a query spoken by a user. The operations also include receiving a text-to-speech (TTS) pronunciation of the same particular word that is present in a TTS input. The TTS input includes a textual representation of a response to the query and the TTS pronunciation of the particular word is different than the user pronunciation of the particular word. The operations also include obtaining user pronunciation-related features associated with the user pronunciation of the particular word and obtaining TTS pronunciation-related features associated with the TTS pronunciation of the particular word. The operations also include generating, as output from a pronunciation decision model configured to receive the user pronunciation-related features and the TTS pronunciation-related features as input, a pronunciation decision selecting the one of the user pronunciation of the particular word or the TTS pronunciation of the particular word that is associated with a highest confidence for use in TTS audio. The operations also include providing, for audible output from a user device associated with the user, the TTS audio that includes a synthesized speech representation of the response to the query using the one of the user pronunciation for the particular word or the TTS pronunciation for the particular word that was selected by the pronunciation decision output from the pronunciation decision model.

This aspect may include one or more of the following optional features. In some implementations, the operations further include receiving audio data that corresponds to the query spoken by the user and processing, using an automated speech recognizer (ASR), the audio data to generate a transcription of the query. In these implementations, receiving the user pronunciation of the particular word includes at least one of: extracting the user pronunciation of the particular word from an intermittent state of the ASR while using the ASR to process the audio data; extracting a user acoustic representation of the particular word from the audio data that conveys the user pronunciation of the particular word; or processing the audio data to generate a user phoneme representation that conveys the user pronunciation of the particular word. The user pronunciation-related features associated with the user pronunciation of the particular word may include one or more confidence features associated with the ASR recognizing the particular word in the audio data.

In some examples, the user pronunciation-related features associated with the user pronunciation of the particular word include at least one of a geographical area of the user when the query was spoken by the user, linguistic demographic information associated with the user, or a frequency of using the user pronunciation when pronouncing the particular word in previous queries spoken by the user and/or other users. Receiving the TTS pronunciation of the particular word may include: receiving, as input to a TTS system, the TTS input that includes a textual representation of the response to the query; generating, as output from the TTS system, an initial sample of TTS audio that includes an initial synthesized speech representation of the response to the query; and extracting a TTS acoustic representation of the particular word from the initial sample of the TTS audio, the TTS acoustic representation conveys the TTS pronunciation of the particular word.

Optionally, receiving the TTS pronunciation of the particular word may include processing the textual representation of the response to the query to generate a TTS phoneme representation that conveys the TTS pronunciation of the particular word. In some examples, the TTS pronunciation-related features associated with the TTS pronunciation of the particular word includes at least one of a verified preferred pronunciation for the particular word, an unverified pronunciation for the particular word estimated using pronunciation mining form one or more auxiliary information sources, a pronunciation variant feature that indicates whether any other variants for pronouncing the particular word exists, or a pronunciation complexity feature that indicates a likelihood of user mispronunciation of the particular word.

In some implementations, after generating the pronunciation decision selecting the one of the user pronunciation of the particular word or the TTS pronunciation of the particular word, the operations further include receiving explicit feedback from the user that indicates which one of the user pronunciation of the particular word or the TTS pronunciation of the particular word the user prefers for pronouncing the particular word in subsequent TTS outputs and updating the pronunciation decision model based on the explicit feedback from the user. Here, when the explicitly feedback from the user indicates that the user prefers the user pronunciation of the particular word, the operations further comprise updating a TTS system to use the user pronunciation of the particular word when generating TTS audio that includes the particular word. In some examples, after providing the TTS audio for audible output from the user device, the operations further include receiving audio data that corresponds to a subsequent query spoken by the user or another user that includes the particular word, determining implicit user feedback that indicates whether or not the user or the other user pronounced the particular word in the subsequent query the same as the one of the user pronunciation for the particular word or the TTS pronunciation for the particular word that was selected by the pronunciation decision, and updating the pronunciation decision model based on the implicit user feedback.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
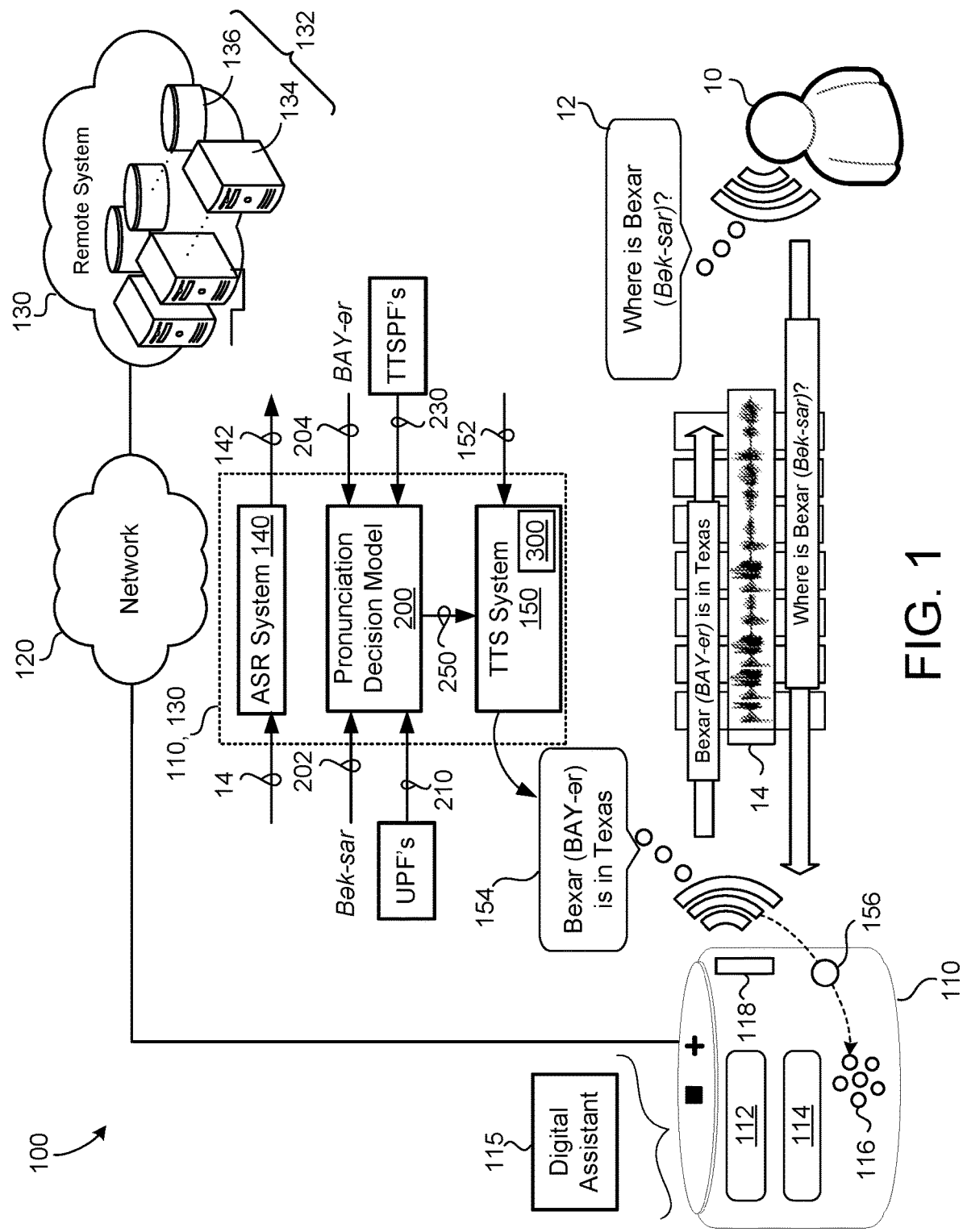
FIG. 1 is a schematic view of an example speech environment.

During a dialog between a user and a digital assistant, such as when a user issues a spoken query for the digital assistant to perform an action and the digital assistant audibly outputs a text-to-speech (TTS) response related to the query, there is often overlap in vocabulary of the spoken query and the TTS response. For instance, the user may speak a voice search query, "Where is Bexar?" in which corresponding audio data is passed to an automated speech recognizer (ASR) for conversion into a corresponding transcript for interpretation by a natural language understanding (NLU) module and provided as a search query to a search engine to retrieve a result. Using the retrieved result, the digital assistant may generate a TTS input that includes a textual representation of a response to the query. Here, the textual representation of the response states, "Bexar is located in Texas", which is provided in the TTS input to the TTS system for generating corresponding TTS audio that includes synthesized speech for audible output from a device associated with the user.

In some instances, a user pronounces a word in the spoken query differently than how the TTS system will pronounce the same word present in a textual representation of the response to the query provided as the TTS input. The difference in competing pronunciations may be attributed to a variety of reasons, such as lack of normalization between the ASR system and the TTS system which are generally trained separately and often out of sync in terms of updates, rare words/terms (e.g., contact names, emerging words, etc.) that the TTS system has not been trained to pronounce, words that a user is unknowingly mispronouncing in which the ASR system is robust for accurately recognizing and the TTS system pronounces correctly, and words that a user is purposely mispronouncing to spoof the ASR system to name a few.

Implementations herein are directed toward identifying when a user pronunciation of a term spoken by a user in a query is different than a TTS pronunciation of the same term present in a response to the query, and using a pronunciation decision model to determine which one of the user pronunciation or the TTS pronunciation to use for pronouncing the word in TTS audio that conveys the response to the user as synthesized speech. As described in greater detail below, the pronunciation decision model may be trained and continuously updated to select between competing pronunciations of a same word based on TTS pronunciation-related features and/or user pronunciation-related features. That is, based on user pronunciation-related features associated with a user pronunciation of a particular word and TTS pronunciation-related features associated with a TTS pronunciation of the particular word, the pronunciation decision model may estimate a confidence in the user pronunciation of the particular word and a confidence in the TTS pronunciation of the same particular word to determine which one of the user pronunciation or the TTS pronunciation is more reliable.

Referring to FIG. 1, in some implementations, a speech environment 100 includes a user 10 speaking a query 12 to a speech-enabled device 110 (also referred to as a device 110 or a user device 110). Specifically, the user 10 is having a dialog with a digital assistant 115 (also referred to as a 'digital assistant interface') executing on the user device 110 where the query 12 spoken by the user 10 requests the digital assistant 115 to perform an operation. The user 10 (i.e., speaker of the query 12) may speak the query 12 to solicit a response from the digital assistant 115 or to have the digital assistant 115 execute a task specified by the query 12. The device 110 is configured to capture sounds from one or more users 10 within the speech environment 100. Speech-enabled systems of the device 110 or associated with the device 110 (e.g., the digital assistant 115) may field the query 12, perform one or more operations specified by the query 12, and provide a response to the query as synthesized speech 154 for audible output from the device 110.

Here, the device 110 captures audio data 14 corresponding to the spoken query 12 by the user 10. The device 110 may correspond to any computing device associated with the user 10 and capable of receiving audio data 14. Some examples of user devices 110 include, but are not limited to, mobile devices (e.g., mobile phones, tablets, laptops, e-book readers, etc.), computers, wearable devices (e.g., smart watches), music player, casting devices, smart appliances (e.g., smart televisions) and internet of things (IoT) devices, remote controls, smart speakers, etc. The device 110 includes data processing hardware 112 and memory hardware 114 in communication with the data processing hardware 112 and storing instructions, that when executed by the data processing hardware 112, cause the data processing hardware 112 to perform one or more operations related to speech and/or text processing. In some examples, the device 110 includes one or more applications (i.e., software applications) where each application may utilize one or more speech processing systems/models 140, 150, 200 associated with the device 110 to perform various functions within the application. For instance, the device 110 executes the digital assistant 115 configured to communicate synthesized playback audio 154 (also referred to as synthesized speech 154) to the user 10 to converse with the user 10 and assist with the performance of various tasks.

The device 110 further includes an audio subsystem with an audio capturing device (e.g., a microphone) 116 for capturing and converting audio data 14 within the speech environment 100 into electrical signals and a speech output device (e.g., a speaker) 118 for communicating an audible audio signal (e.g., a synthesized playback signal 154 from the device 110). While the device 110 implements a single audio capturing device 116 in the example shown, the device 110 may implement an array of audio capturing devices 116 without departing from the scope of the present disclosure, whereby one or more audio capturing devices 116 in the array may not physically reside on the device 110, but be in communication with the audio subsystem (e.g., peripherals of the device 110). For example, the device 110 may correspond to a vehicle infotainment system that leverages an array of microphones positioned throughout the vehicle. Similarly, the speech output device 118 may include one or more speakers either residing on the device 110, in communication therewith, or a combination where one or more speakers reside on the device 110 and one or more other speakers are physically removed from the device 110 but in communication with the device 110.

Furthermore, the device 110 may be configured to communicate via a network 120 with a remote system 130. The remote system 130 may include remote resources 132, such as remote data processing hardware 134 (e.g., remote servers or CPUs) and/or remote memory hardware 136 (e.g., remote databases or other storage hardware). The device 110 may utilize the remote resources 132 to perform various functionality related to speech processing and/or synthesized playback communication. For instance, the device 110 is configured to perform speech recognition using an automated speech recognition (ASR) system 140 and/or conversion of text to speech using a text-to-speech (TTS) system 150. Additionally, a pronunciation decision model 200 may generate a pronunciation decision 250 selecting between a user pronunciation 202 or a TTS pronunciation 204 for a particular word that is present in both the query 12 spoken by the user 10 and a TTS input 152 corresponding to a textual representation of a response to the query 12. The TTS system 150 produces TTS audio 154 including a synthesized speech representation of the response to the query 12, whereby the TTS audio 154 pronounces the particular word using the one of the user pronunciation 202 or the TTS pronunciation 204 that was selected by the pronunciation decision 250 output from the pronunciation decision model 200.

These systems/models 140, 150, 200 may reside on the device 110 (referred to as on-device systems) or reside remotely (e.g., reside on the remote system 130), but in communication with the device 110. In some examples, some of these systems 140, 150, 200 reside locally or on-device while others reside remotely. In other words, any of these systems 140, 150, 200 may be local, remote, or both in any combination. For instance, when a system 140, 150, 200 is rather large in size or processing requirements, the system 140, 150, 200 may reside in the remote system 130. Yet when the device 110 may support the size or the processing requirements of one or more systems 140, 150, 200, the one or more systems 140, 150, 200 may reside on the device 110 using the data processing hardware 112 and/or the memory hardware 114. Optionally, the one or more of the systems 140, 150, 200 may reside on both locally/on-device and remotely. For instance, one or more of the systems 140, 150, 200 may default to execute on the remote system 130 when a connection to the network 120 between the device 110 and remote system 130 is available, but when the connection is lost or the network 120 is unavailable, the systems 140, 150, 200 instead execute locally on the device 110.

In the example shown, the ASR system 140 receives, as input, audio data 14 corresponding to the query 12 and processes the audio data 14 to generate, as output, a transcription 142 of the query 12. The ASR system 140 may include natural language understanding (NLU) functionality to perform query interpretation (e.g., semantic analysis) on the transcription 142. The transcription 142 includes a graphemic representation represented by a sequence of text that the digital assistant 115 may then use to generate the response to the query 12, and more particularly, generate the TTS input 152 corresponding to the textual representation of the response to the query 12. For instance, continuing with the example from earlier, the user 10 may speak the query "Where is Bexar?" which is captured and converted into corresponding audio data 14 for processing by the ASR system 140 to generate the corresponding transcription 142. While the canonical pronunciation for the word Bexar is "BAY-ə r" in the context of Texas, the user 10 unknowingly mispronounced the word Bexar as "Bə k-sar" based on its English spelling by enunciating the "X". Notably, the ASR system 140 is robust for accurately recognizing the user mispronunciation of the word Bexar as the city in Texas.

After generating the transcription 142 (and performing any NLU functionality), the digital assistant 115 may then determine the response to the query 12 using the transcription 142. For instance, in order to determine the location for a city name (e.g., Bexar), the digital assistant 115 may pass the transcription 142 ("Where is Bexar?) or a search string that includes identifying portions of the transcription (e.g., "where" and "Bexar") to a search engine. The search engine may then return one or more search results that the digital assistant 115 interprets to generate the TTS input 152 that includes the textual representation of the response to the query 12. Notably, the word "Bexar" is present in both the transcription 142 of the query 12 and the TTS input 152, whereby the transcription 142 and the textual representation of the TTS input 152 both share a same graphemic representation of the word "Bexar". The textual representation may include a sequence of graphemes/characters in a particular natural language. The sequence of graphemes/characters can include letters, numbers, punctuation marks, and/or other special characters.

The TTS system 150 may convert the TTS input 152 into corresponding TTS audio 154 (e.g., synthesized speech) that the device 110 will audibly output for communicating the response to the query 12 to the user 10. Prior to audible output of the TTS audio 154, the TTS system 150 and/or the pronunciation decision model 200 may identify that the user pronunciation 202 of a particular word present in the query 12 is different than the TTS pronunciation 204 of the same particular word that is present in the TTS input 152. In the example shown, the user pronunciation 202 of the word Bexar is "Bə k-sar" while the TTS pronunciation 204 of the word Bexar is "BAY-ə r". In some implementations, the pronunciation decision model 200 obtains user pronunciation-related features (UPFs) 210 associated with the user pronunciation 202 of the particular word and TTS pronunciation-related features (TTSPFs) 230 associated with the TTS pronunciation 204 of the particular word. While a multitude of different UPFs 210 and TTSPFs 230 may be obtained and form a basis for generating the pronunciation decision 250 as described in greater detail below with reference to FIG. 2, the pronunciation decision model 200 depicted in the present example of FIG. 1 obtains UPFs 210 that include user statistics indicating that users frequently mispronounce Bexar, as well as TTSPFs 230 indicating that Bexar in the context of Texas is widely pronounced as "BAY-ə r". Accordingly, the pronunciation decision model 200 may estimate a confidence for the user pronunciation 202 of Bexar that is lower than a confidence estimated for the TTS pronunciation 204 of Bexar due to the fact that users commonly mispronounce Bexar and the TTS pronunciation 204 is widely adopted when spoken in the context of Texas. Notably, the TTS pronunciation 204 of "BAY-ə r" for the word Bexar present in the textual representation of the TTS response is not verified, but instead learned by the TTS system 150 through pronunciation mining from one or more auxiliary information sources. For instance, the auxiliary information sources may include audio and/or video web sources that may be mined for pronunciation of various terms within various contexts for use by the TTS system 150.

When the TTS system 150 generates the TTS audio 154 from the TTS input 152, the TTS output 154 includes synthesized speech that approximates how a human would pronounce words formed by the sequence of graphemes/characters defining the TTS input 152 including the textual representation of the response to the query 12. Continuing the example, the pronunciation decision 250 selecting the TTS pronunciation 204 of the particular word Bexar results in maintaining the use of the TTS pronunciation 204 in the TTS audio 154 and providing the TTS audio 154 for audible output from the user device 110. Thus, the TTS audio 154 is audibly output as a synthesized speech representation of the response to the query 12 and uses the TTS pronunciation 204 of "BAY-ə r" for the textual representation of the word Bexar that is present in the TTS input 152.

In some examples, after providing the TTS audio 154 for audible output using the selected one of the user pronunciation 202 or the TTS pronunciation 204 for a particular word, the pronunciation decision model 200 and/or TTS system 150 prompts the user 10 to provide explicit feedback indicating if the user 10 agrees with the pronunciation decision 250 or instead prefers the other one of the user pronunciation 202 or the TTS pronunciation 204 that was not selected in the pronunciation decision 250. More specifically, the explicit feedback indicating a preferred pronunciation for a particular word may be used as a TTSPF 230 obtained by the pronunciation decision model 200 when making a subsequent pronunciation decision 250 for competing user and TTS pronunciations of the particular word. The user 10 may be prompted to provide explicit feedback when the model 200 estimates confidences for the user and TTS pronunciations 202, 204 that are close (e.g., within a threshold confidence range) and/or when the confidences fail to satisfy a confidence threshold. The explicit feedback may be used to update the pronunciation decision model 200 and/or the TTS system 150. Prior to updating the pronunciation decision model 200 and/or TTS system 150, additional verification steps may be carried out to verify that the preferred pronunciation for the particular word is a reasonable variant and/or verify that the explicit feedback is not an adversarial user correction.

In an alternative implementation of the example above, if the TTSPFs 230 indicated that the user pronunciation 202 of "Bə k-sar" for the word Bexar was previously specified by the user 10 as a preferred pronunciation, then the pronunciation decision model 200 would likely estimate a higher confidence for the user pronunciation 202 than the TTS pronunciation 204, thereby resulting in the TTS system 150 modifying the TTS audio 154 to adopt the user pronunciation 202. In this implementation, if the TTS system 150 were a local/custom TTS system 150 specific to the user, the TTSPF 230 indicating the user pronunciation 202 of "B ə k-sar" for the word Bexar as a preferred pronunciation may result in retraining the TTS system 150 so that the TTS system 150 initially generates TTS audio 154 by pronouncing the word Bexar as "Bə k-sar" when present in the TTS input 152.

The TTS system 150 may include any type of TTS system capable of converting input text (e.g., TTS input) into a corresponding synthetic speech representation as TTS audio 154. For instance, the TTS system 150 may employ a parametric TTS model or a TTS model 300 (TTS model of FIG. 3) that utilizes a deep neural network (e.g., an attention-based Tacotron network) to generate the TTS audio 154 for audible output as synthesized speech. In some implementations, the TTS model processes embeddings that are encoded representations of speech features (e.g., features of the TTS input 152) to generate audio waveforms (e.g., time-domain audio waveforms that define an audio signal's amplitude over time) representing TTS audio 154. Once generated, the TTS system 150 communicates the TTS audio 154 to the device 110 to allow the device 110 to output the TTS audio 154 as a synthesized speech representation of the response to the query 12. For instance, the device 110 audibly outputs, from the one or more speakers 118, the TTS audio 154 of "Bexar is in Texas" using the TTS pronunciation 204 of B ə k-sar selected by the pronunciation decision 250 output from the model 200. Here, the TTS model 300 of the TTS system 150 is configured to control the speech-related attributes of the synthesized speech 154. In other words, the TTS model 300 is configured to simulate the voice of a human speaker in terms of naturalness while also being able to generate diverse synthesized speech by modeling fine-grained latent features. Although FIG. 1 depicts an example of a TTS system 150 in the context of an application for a digital assistant 115, the TTS system 150 (e.g., using the TTS model 300) is applicable in other text-to-speech scenarios, such as, for example, voice search, navigation or reading documents.

In some implementations, when the TTS model 300 associated with the TTS system 150 resides on the user device 110 but is trained as a global model shared across users in a geographical area, federation learning techniques are employed to update/retrain the model 300. For instance, the user device 110 may retrain/update parameters of an on-device version of the TTS model 300 executing locally and then share the updated parameters or training losses with a server for updating the global TTS model 300. In doing so, the global TTS model 300 may be retrained/updated using the parameter updates/training losses received from multiple users without requiring the users across the user population to share their audio data, query content, or other information that users may not want to share.

Figure 3:
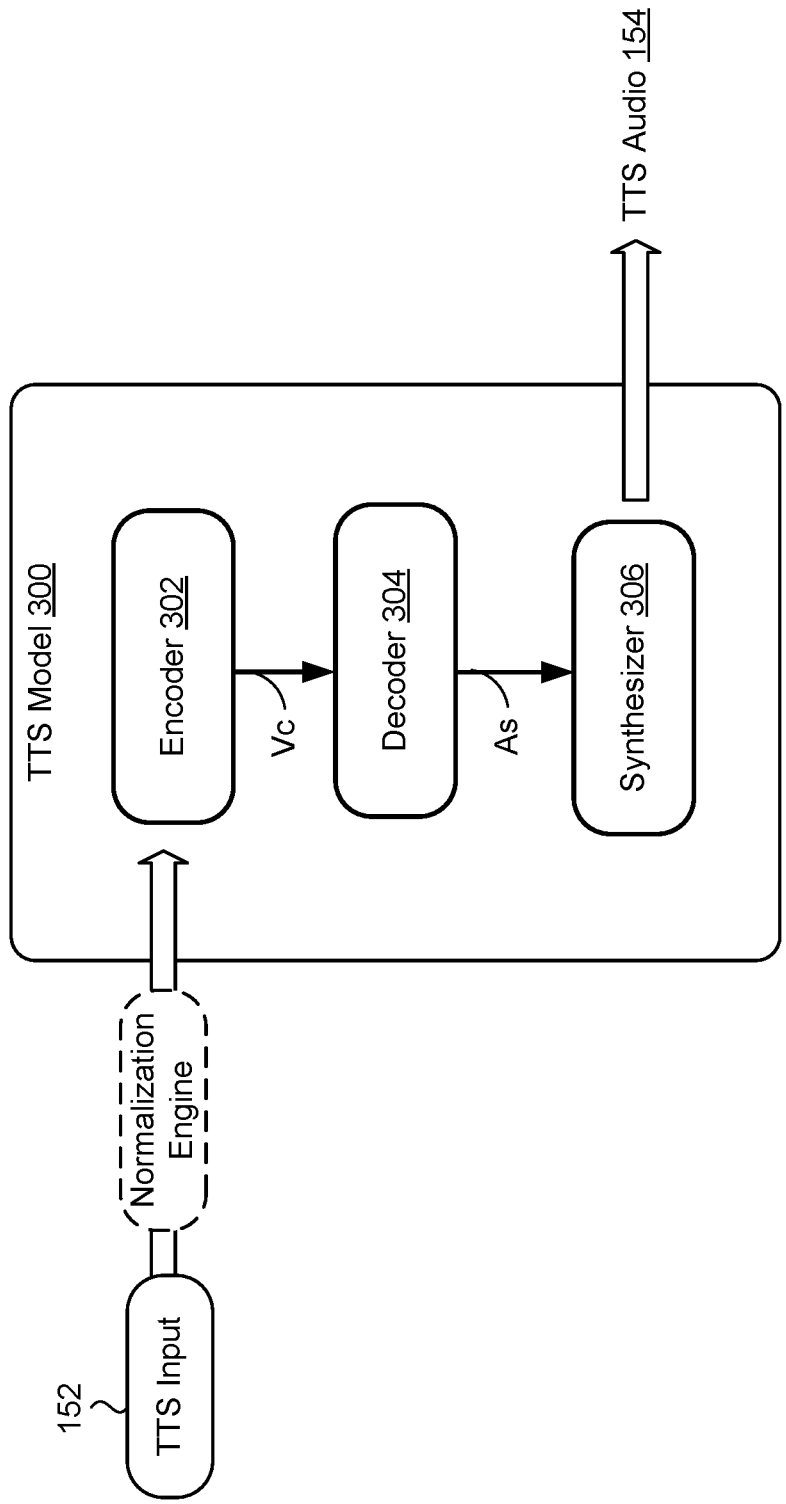
FIG. 3 is a schematic view of an example text-to-speech model for generating TTS audio.

Referring to FIG. 3, in some examples, the TTS model 300 includes an encoder-decoder network architecture having an encoder 302 and a decoder 304. In some implementations, the encoder-decoder 302, 304 structure corresponds to the sequence-to-sequence recurrent neural network (RNN) of Tacotron 2 (e.g., described in Shen, *Natural TTS Synthesis by Conditioning WaveNet on Mel Spectrogram Predictions*, available at https://arxiv.org/pdf/1712.05884.pdf, and incorporated herein by reference). In some configurations, the encoder 302 is configured to receive, as input, the TTS input 152 or an embedding corresponding to the TTS input 152 (e.g., character embeddings) and generate, as output, a context vector Vc for each Mel frequency spectrogram that the decoder 304 will later generate. The context vector Vc may be a fixed length and generally define features that appear in particular positions corresponding to the sequence of characters forming textual representation of the TTS input 152. In some configurations, the TTS input 152 includes grapheme sequence that is first converted into a corresponding phoneme sequence (e.g., via a normalization engine such as a grapheme-to-phoneme model) prior to being input into the encoder 302.

The encoder 302 may include one or more convolutional layers followed by a bidirectional long short-term memory (LTSM) layer. The neurons in each convolution a layer may receive input from a small subset of neurons in a previous layer. In this respect, neuron connectivity allows the convolutional layers to learn filters that activate when particular hidden features appear in positions in the sequence of characters corresponding to textual representation of the TTS input 152. In some implementations, the filter in each convolutional layer may span a series of characters (e.g., four, five, or six characters). Each convolutional layer may be followed by batch normalization and rectified linear units (RELUs). When the encoder 302 includes one or more convolutional layers, a bidirectional LSTM layer may follow these convolutional layers. Here, the bidirectional LSTM is configured to process the hidden features generated by the final convolutional layer in order to generate a sequential feature representation of the sequence of characters corresponding to the TTS input 152. The sequential feature representation may include a sequence of feature vectors.

In some implementations, the encoder 302 also includes an attention network configured to receive a sequential feature representation from the encoder 302 and to process the sequential feature representation to generate the context vector Vc for each decoder output step. That is, the attention network can generate a fixed length context vector Vc for each frame of a Mel frequency spectrogram that a decoder 304 will later generate. A frame refers to a unit of the Mel frequency spectrogram that is based on a small portion of the input signal (e.g., a 10 millisecond sample). The architecture of the attention network may vary depending on the particular TTS system 150. Some examples of attention networks include additive attention networks, location sensitive attention networks, Gaussian Mixture Model (GMM) attention networks (e.g., to improve generalization to long utterances), forward attention networks, stepwise monotonic attention networks, or dynamic convolution attention networks. With an attention network, the TTS model 300 may be able to generate an output sequence (e.g., a sequence of output log-mel spectrogram frames) based on additional inputs (e.g., with speech embeddings e) that receive particular attention weights in order to generate the context vector Vc.

The decoder 304 is configured as a neural network (e.g., an autoregressive recurrent neural network) to generate an output audio signal As (e.g., an output sequence mel-frequency spectrograms) of expressive speech that includes the intended speech-related attributes (e.g., the TTS pronunciation for each word present in the TTS input 152, the intended prosody and/or speech characteristics). For instance, based on the context vector Vc, the decoder 304 predicts a representation of a speech signal (e.g., a mel frame or spectrogram frame) from the encoded representation generated by the encoder 302. That is, the decoder 304 is configured to receive, as input, one or more context vectors Vc and may generate, for each context vector Vc, a corresponding frame of a mel-frequency spectrogram where a mel-frequency spectrogram is a frequency-domain representation of sound. In some examples, the decoder 304 includes an architecture similar to Tacotron 2. In other words, the decoder 304 may include an architecture having a pre-net, a Long Short-Term Memory (LSTM) subnetwork, a linear projection, and a convolutional post-net.

In some configurations, the TTS model 300 also includes a speech synthesizer 306 (also referred to as a synthesizer 306). The synthesizer 306 can be any network that is configured to receive a Mel frequency spectrogram and to generate output samples of TTS audio 154 based on the Mel frequency spectrogram as synthesized speech. In some other implementations, the synthesizer 306 includes a vocoder. For instance, the speech synthesizer 306 may include a WaveRNN vocoder (e.g., as described by "Natural TTS Synthesis by Conditioning WaveNet on Mel Spectrogram Predictions," by J. Shen, et al., available at, e.g., https://arxiv.org/abs/1712.05884). Here, the WaveRNN vocoder may generate 16-bit signals sampled at 24 kHz conditioned on spectrograms predicted by the TTS model 300. In some other implementations, the synthesizer 306 is a trainable spectrogram to waveform inverter. After the synthesizer 306 generates the waveform, an audio subsystem can generate the TTS audio 154 using a waveform and provide the TTS audio 154 for audible playback (e.g., on the device 110) as synthesized speech, or provide the generated waveform to another system to allow the other system to generate and play back the TTS audio 154. Generally speaking, the synthesizer 306 has little to no impact on resulting pronunciation, prosody and/or style of the synthesized speech 154, and in practice, only impacts audio fidelity of the TTS audio 154 as the synthesizer 306 converts a representation of a speech signal (e.g., a mel frame or spectrogram frame output by the decoder 304) into a waveform.

Figure 2:
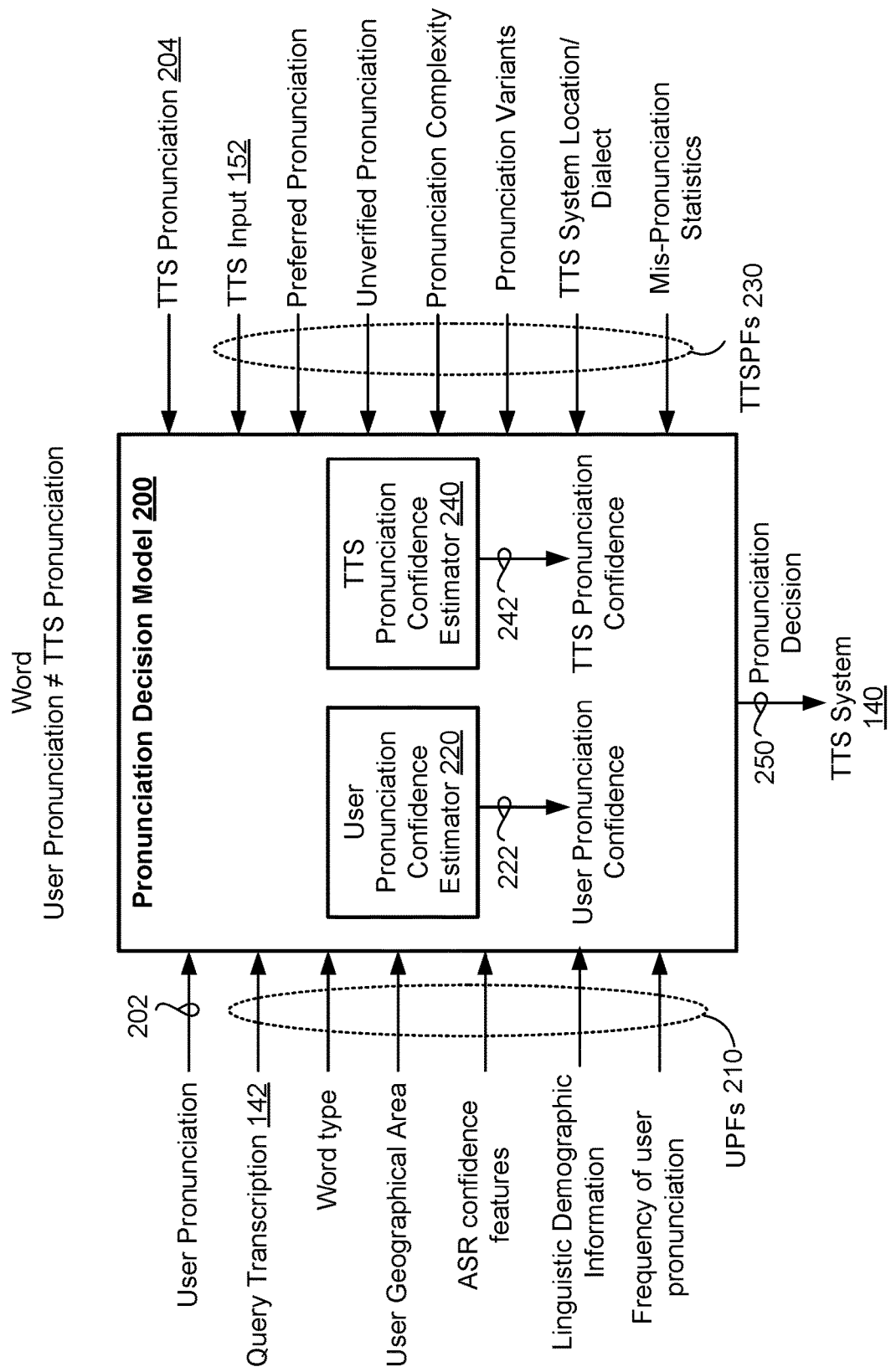
FIG. 2 is a schematic view of an example pronunciation decision model for deciding which one of a user pronunciation of a particular word or a text-to-speech pronunciation of the particular word is more reliable for use in text-to-speech audio.

FIG. 2 shows a schematic view of an example pronunciation decision model 200 generating a pronunciation decision 250 that selects which one of a user pronunciation 202 of a particular word or a different TTS pronunciation 204 of the same particular word is more reliable for use in TTS audio 154. The pronunciation decision model 200 may execute on the user device 110, the remote system 130, or a combination thereof. In some implementations, the pronunciation decision model 200 is user-specific in that the pronunciation decision model 200 is customized for making pronunciation decisions 250 specific to the user 10 based on learnings from dialogs/interactions between the user 10 and the digital assistant 115. In other implementations, the pronunciation decision model 200 is shared by multiple users and instantaneously learns to make pronunciation decisions 250 based on dialogs all the users 10 have with their digital assistants 115.

The pronunciation decision model 200 may receive the user pronunciation 202 for the particular word using various techniques. For instance, the user pronunciation 202 of the particular word may be extracted from an intermittent state of the ASR system 140 while the ASR system 140 was processing the audio data 14 corresponding to the query 12 spoken by the user. In another implementation, the model 200 receives the user pronunciation 202 of the particular word by extracting a user acoustic representation of the particular word from the audio data. Here, the user acoustic representation conveys the user pronunciation 202 for the particular word. In yet another implementation, the audio data 14 corresponding to the query 12 is processed to generate a user phoneme representation that conveys the user pronunciation of the particular word. The presented disclosure is not limited to any specific technique for obtaining user pronunciation of words.

The pronunciation decision model 200 may receive the TTS pronunciation 204 for the particular word using various techniques. In one example, the pronunciation decision model 200 receives a phoneme representation that conveys the TTS pronunciation 204 of the particular word. For instance, the TTS system 150 may include a grapheme-to-phoneme model (e.g., normalization engine of FIG. 3) that converts a grapheme representation of the TTS input 152 into a corresponding phoneme representation. In another example, a TTS acoustic representation (e.g., a waveform) of the particular word is extracted from an initial sample of TTS audio generated by the TTS system 150 (but not audibly output). Here, the acoustic representation conveys the TTS pronunciation 204 of the particular word. The TTS acoustic representation could also be extracted from the audio signal As (e.g., the output sequence mel-frequency spectrograms) generated as output from the decoder 304 of the TTS model 300 of FIG. 3. In yet another example, the TTS pronunciation 204 is extracted from an intermittent state of the TTS system 150 while processing the textual representation of the TTS input 152 for conversion into speech. For instance, the extracted intermittent state of the TTS system 150 may include a sequence context vectors Vc output from the encoder 302 of the TTS model 300 of FIG. 3.

For a particular word present in both a query 12 spoken by the user 10 and a TTS input 152 including a textual representation of a response to the query 12, the TTS system 150 or the pronunciation decision model 200 may identify when the user pronunciation 202 and the TTS pronunciation 204 of the particular word are different from one another, and thus competing as to which one will ultimately be used for pronouncing the particular word in the TTS audio 154 provided for audible output as synthesized speech. The pronunciation decision model 200 is trained to generate the pronunciation decision 250 based on one or more user pronunciation-related features (UPFs) 210 and/or one or more TTS pronunciation-related features (TTSPFs) 230 associated with the particular word. Here, the pronunciation decision 250 selects the one of the user pronunciation 202 or the TTS pronunciation 204 associated with a highest confidence to use for pronouncing the particular word in the TTS audio 154 conveying the response to the query 12. In some examples, the pronunciation decision model 200 includes a user pronunciation confidence estimator 220 and a TTS pronunciation estimator 240. In these examples, the user pronunciation confidence estimator 220 estimates a user pronunciation confidence 222 for the user pronunciation 202 of the particular word that indicates a likelihood that the user pronunciation 202 is preferred. On the other hand, the TTS pronunciation estimator 240 estimates a TTS pronunciation confidence 242 for the TTS pronunciation 204 of the particular word that indicates a likelihood that the TTS pronunciation 204 is preferred. In some implementations, the pronunciation decision model 200 generates the pronunciation decision 250 as a log-likely ratio between the user pronunciation confidence 222 and the TTS pronunciation confidence 242.

The UPFs 210 associated with the user pronunciation 202 of the particular word may include a multitude of different features conveying information helpful for the pronunciation decision model 200 in ascertaining the reliability (or unreliability) associated with the pronunciation of the particular word when spoken by the user 10 in the query 12. For instance, the transcription 142 of the query 12 may convey the word type of the particular word and the context of the particular word in view of other words recognized in the transcription. Additionally, linguistic demographic information associated with the user 10 may convey a proficiency of the user in a particular language. For instance, a user 10 that speaks American English as a native language may be prone to mispronouncing a name of an Italian restaurant, whereas a bilingual speaker of English and Italian is less likely to mispronounce Italian names/words. The UPFs may provide any type of demographic information, such as age and gender, associated with the user 10. The geographical area in which the user 10 is located when the query 12 was spoken may serve as a UPF 210 associated with the user pronunciation 202 of the particular word. For example, in a query 12 for navigation instructions to a street address with an uncommon name, the TTS system 150 may be inclined to mispronounce the uncommon name since the presence of the uncommon name may be scarce or non-existent in training examples used to train the TTS system 150. Accordingly, UPFs 210 specifying that the user's geographical area is proximate to the requested street address with the uncommon name may serve as a strong indicator that the user pronunciation 202 of the uncommon name may be more reliable than the TTS pronunciation 204 of the uncommon name. The user may explicitly grant access to the user's geographical area and may deny access to the geographical area at any time. In this scenario, coupled with the geographical area of the user 10 provided by the UPF 210, a TTSPF 230 indicating that the location/dialect for which the TTS system 150 is trained may be outside the geographical area associated with the requested street address, thereby further bolstering the user pronunciation confidence 222 and/or reducing the TTS pronunciation confidence 242.

Moreover, historical information providing a frequency of using the user pronunciation 202 when pronouncing the particular word in previous queries spoken by the user and/or other users may serve as UPFs 210 provided as input to the pronunciation decision model 200. For example, multiple users across a geographical area frequently using a same user pronunciation 202 for a particular word may indicate emergent pronunciations and/or untracked dialectical variations for which the TTS system 150 and/or ASR system 140 have not been trained. In addition to improving the confidence pronunciation decision 250 generated by the model 200, the knowledge of emergent pronunciations and/or untracked dialectical variations in pronouncing a particular word may be used for updating the TTS system 150 to learn to produce TTS audio 154 that reflects the user pronunciation 202 of the particular word.

In some examples, establishing a threshold frequency of the user 10 using the user pronunciation 202 of the particular word in previous queries 12 serves as implicit user feedback indicating the user pronunciation 202 as a preferred pronunciation of the particular word. For example, in one or more previous dialog sessions where the decision model 200 selected the TTS pronunciation 204 over the different user pronunciation 202 for pronouncing the particular word in TTS audio 154, subsequent queries 12 where the user 10 and/or other users continued to use the user pronunciation 202 for pronouncing the particular word may indicate that the user 10 and/or other users prefer the user pronunciation 202 over the TTS pronunciation 204. This implicit feedback may be further used to train/update the TTS system 150.

In some additional implementations, the UPFs 210 associated with the user pronunciation 202 of the particular word include one or more ASR confidence features indicating a likelihood that the recognition of the particular word by the ASR system 140 in the audio data 14 is correct. The pronunciation decision model 200 may obtain the ASR confidence features directly from the ASR system 140 used for generating the transcription 142 of the query 12. The ASR confidence features may include, without limitation, likelihood/posterior scores associated with recognizing the particular word, a confidence score (obtained by the ASR system 140 or an auxiliary confidence model) indicating the likelihood that the particular word was recognized correctly, and any recognition confusability associated with recognizing the word. Here, recognition confusability may be ascertained from word lattice posteriors of candidate recognition results for the transcription 142 and/or entropy of posterior distribution of possible recognition results of a neural network model of the ASR system 150.

In one example, a previous misrecognition of the particular word by the ASR system 140 when pronounced using the TTS pronunciation 204 followed by a subsequent successful recognition of the particular word that instead pronounced the word using the user pronunciation 202 may indicate that the user pronunciation 202 is not reliable because it is likely that the user 10 only chose the user pronunciation 202 to spoof the ASR system 140 and avoid misrecognition errors. Such knowledge may be used to update the ASR system 140 to become robust in recognizing the TTS pronunciation 204 of the particular word. Additionally or alternatively, knowledge that a previous misrecognition of the particular word by the ASR 140 when pronounced using the user pronunciation 202 followed by a subsequent recognition of the particular word that was instead pronounced using the TTS pronunciation 204 may be used to update the ASR system 140 to become robust in recognizing the user pronunciation 202.

Similar to the UPFs 210, the TTSPFs 230 associated with the TTS pronunciation 204 of the particular word may include a multitude of different features conveying information helpful for the pronunciation decision model 200 in ascertaining the reliability (or unreliability) for using the TTS pronunciation 204 to pronounce the particular word present in the TTS input 152 received by the TTS system 150. For instance, the TTS input 152 including the textual representation of the response to the query 12 may convey the word type of the particular word and the context of the particular word in view of other words present in the TTS input 152. Additionally, the geographical area/dialect for which the TTS system 150 is trained may be provided as a TTSPF 230 to the pronunciation decision model 200.

In some examples, the TTSPFs 230 indicate whether the TTS pronunciation 204 includes a verified preferred pronunciation for the particular word. A TTS pronunciation 204 that is verified as a preferred pronunciation may serve as a strong indicator for increasing the TTS pronunciation confidence 242 estimated by the TTS pronunciation confidence estimator 240 for the TTS pronunciation 204 and decreasing the user pronunciation confidence 222 estimated by the user pronunciation confidence estimator 220 for the user pronunciation 202. A preferred pronunciation for a particular word may be verified manually during training of the TTS system 150 by training the TTS system 150 on training sample pairs that map audio of preferred pronunciations of particular words with corresponding graphemic representations. For instance, when a user 10 who does not speak Swedish as a native language is traveling abroad in Sweden and speaks a query 12 for directions to a city in Sweden but mispronounces the city name, TTSPFs 230 indicating that the TTS system 150 is trained for Sweden and the TTS pronunciation 204 of the city name is verified will increase confidence that the TTS pronunciation 204 is more reliable than the user pronunciation 202.

Preferred pronunciations may also include user-verified preferred pronunciations in which the user 10 provides preferred pronunciations for words specified by the user and configures the TTS system 150 to use the preferred pronunciations for pronouncing the words in TTS audio 154. This scenario is common for pronouncing custom names or contact names that may have unique pronunciations that the TTS system 150 would otherwise pronounce differently based solely on graphemic representations of the those names. Similarly, the ASR system 150 may have difficulty in accurately recognizing these contact names due to their unique pronunciations. To provide a preferred pronunciation for a particular word (e.g., a name or other proper noun), the user may speak the word using the preferred pronunciation and the TTS system 150 may map the preferred pronunciation to a corresponding graphemic representation so that the TTS system 150 pronounces the word using the preferred pronunciation when the corresponding graphemic representation is present in a TTS input 152.

In other examples, the user 10 provides a preferred pronunciation for a particular word via explicit feedback during a previous dialog session with the digital assistant 115. In these examples, after audible output of TTS audio 154 conveying a response to a query in which a particular word is pronounced differently than how the word was pronounced in the query spoken by the user 10, the digital assistant 115 may prompt the user 10 to provide explicit feedback to indicate which pronunciation the user prefers for pronouncing the word in subsequent TTS audio 154. In another scenario, without being prompted, the user 10 may provide explicit feedback by blurting out a response such as, "You didn't say it right" or "You mean [using the preferred pronunciation]?", if the user 10 is not satisfied with the pronunciation of a particular word in TTS audio 154. While a TTSPF 230 indicating that the TTS pronunciation 204 of a particular word includes a user-verified preferred pronunciation seems to conflict the notion of why the user would consciously choose to use a different user pronunciation 202 of the particular word when speaking a query 12, the user 10 may be intentionally mispronouncing, or at least pronouncing the particular word inconsistent with the pronunciation preferred by the user 10, as an effort to spoof the ASR system 140 and avoid misrecognition errors.

In some implementations, the TTSPFs 230 indicate whether the TTS pronunciation 204 includes an unverified pronunciation for the particular word. An unverified pronunciation may increase the confidence in the reliability of the TTS pronunciation, but to a lesser extent than a verified pronunciation. The TTS pronunciation 204 for a particular word may be unverified when the pronunciation is learned/ estimated by the TTS system 150 via pronunciation mining from one or more auxiliary information sources. For instance, in the example above, the TTS system 150 may learn the TTS pronunciation 204 for the word/term Bexar as an unverified pronunciation estimated using pronunciation mining from audio and/or video information sources that correctly use the canonical pronunciation "BAY-ar" in the context of Texas.

Additionally or alternatively, other TTSPFs 230 input to the pronunciation decision model 200 for making pronunciation decisions 250 include, without limitation, pronunciation variant and pronunciation complexity features. A pronunciation variant feature may indicate whether any other variants for pronouncing the particular word exist. These variants in pronunciation of a particular word may be learned by the pronunciation decision model 200 over time. Different pronunciations may be mapped to different contexts. For instance, a vast majority of speakers may use a particular pronunciation of a particular word while speakers in a specific geographical region may exclusively pronounce the same word differently. On the other hand, a pronunciation complexity feature may indicate a likelihood of user mispronunciation of the particular word. The TTS system 150 may provide a pronunciation complexity feature indicating the strong likelihood of user mispronunciation by identifying specific phoneme sequences/representations that may be perceived as difficult for users to pronounce. TTSPFs 230 may further indicate mis-pronunciation statistics indicating a frequency in which a user population mispronounces the particular word in queries.

Figure 4:
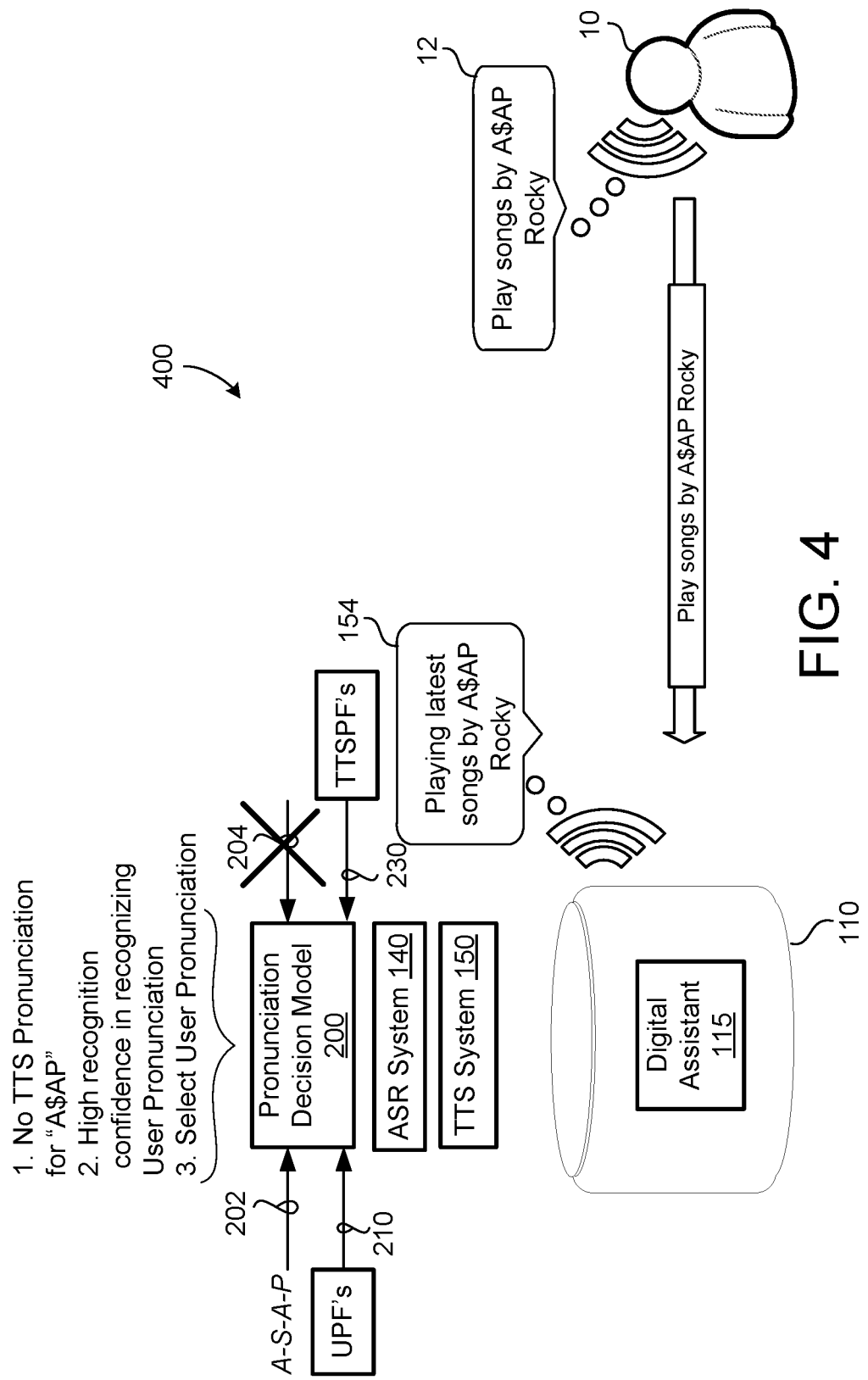
FIG. 4 is a schematic view of an example dialog where a user pronunciation for a particular word is different and more reliable than a TTS pronunciation for the same word.

FIG. 4 provides a schematic view 400 of an example dialog between a user 10 and a digital assistant 115 executing on a user device 110 in which a user pronunciation 202 for a particular word present in a query 12 is different than a TTS pronunciation 204 of the same word present in a TTS input 152 conveying a response to the query 12. In the example shown, the user 10 speaks the query 12, "Play songs by A$AP Rocky," directed toward the digital assistant 115. In this example, the user pronunciation 202 of the word "A$AP" is A-S-A-P and the ASR system 140 is robust for correctly recognizing the user pronunciation 202 as "A$AP". Here, the ASR system 140 generates a transcript 142 of the query 12 and applies NLU functionality to interpret the query 12 as a request for the digital assistant 115 to have a music player application audibly output music songs by the artist named A$AP Rocky. The digital assistant 115 also generates a response to the query 12 confirming that the digital assistant 115 understands the query 12 and is in progress of fulfilling the query 12. Here, the digital assistant 115 generates a textual representation of the response to the query 12, "Playing latest songs by A$AP Rocky", which is provided as a TTS input 152 to the TTS system 150 for conversion into TTS audio 154.

However, in this scenario, the TTS system 150 does not know how pronounce the word "A$AP" present in the TTS input 152, and therefore no TTS pronunciation 204 exists for the word "A$AP". Based on UPFs 210 that include one or more ASR confidence features indicating there is a strong confidence for recognizing the word A$AP pronounced using the user pronunciation 202, the pronunciation decision model 200 may conclude that the user pronunciation confidence 222 is high and therefore generate a pronunciation decision 250 that selects the user pronunciation 202 of A-S-A-P for pronouncing the word A$AP in the TTS audio 154. In the example shown, the TTS audio 154 is audibly output from the user device 110 and includes a synthesized speech representation of the response to the query 12 that uses the user pronunciation 202 to pronounce the word "A$AP".

If the pronunciation decision 250 is associated with a confidence that does not meet a certain threshold, the model 200 and/or TTS system 150 may determine there may be some doubt for using the user pronunciation 202 and therefore prompt the user 10 to indicate whether or not the agrees with the pronunciation decision 250 or prefers a different pronunciation. The user's response to the prompt may include explicit feedback as described above. The prompt may be an audible prompt in which the TTS system 150 outputs synthesized speech asking the user 10 if he or she agrees with the pronunciation decision or prefers a different pronunciation. The prompt may additionally or alternatively include a visual prompt that display a notification on a screen in communication with the user device 110. Here, the user could provide a user input indication selecting a graphical element indicating the preferred pronunciation, or at a minimum, indicating satisfaction or dissatisfaction with the pronunciation decision 250.

When the pronunciation decision 250 selects the user pronunciation 202 as more reliable than the TTS pronunciation 204 (or no TTS pronunciation 204 is available), scenarios may exist when the TTS system 150 is unable to produce TTS audio 154, or the TTS audio 154 would otherwise include a synthesis quality not meeting quality standards, using the user pronunciation 202 for pronouncing the particular word. This scenario may occur when the user pronunciation 202 of the particular word is spoken in an accent/dialect different than the accent/dialect for which the TTS system 150 (and associated TTS model 300) was trained. The TTS system 150 may employ a variety of different techniques for producing the TTS audio 154 using the user pronunciation 202 on-the-fly. In some examples, the TTS system 150 uses an acoustic representation of the particular word extracted from the audio data 14 corresponding to the query 12 spoken by the user. In these examples, the acoustic representation of the particular word extracted from the audio data 14 may be inserted into the TTS audio 154. On the other hand, the TTS system 150 may further extract a phonemic representation from the acoustic representation of the particular word and use the phonemic representation to produce the TTS audio 154 with the user pronunciation 202 of the particular word.

In additional examples, the TTS system 150 obtains a latent representation derived from a portion of the audio data 14 corresponding to the spoken query 12 that includes the user pronunciation 202 of the particular word. In these examples, the latent representation guides the TTS system 150 (and associated TTS model) to produce the TTS audio 154 that pronounces the particular word using the user pronunciation 202. In yet another example, voice conversion techniques are applied to the portion of the audio data 14 corresponding to the spoken query 12 that includes the user pronunciation 14 to produce TTS audio 154 that uses the user pronunciation 202 to pronounce the particular word in the synthesized voice.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

Figure 5:
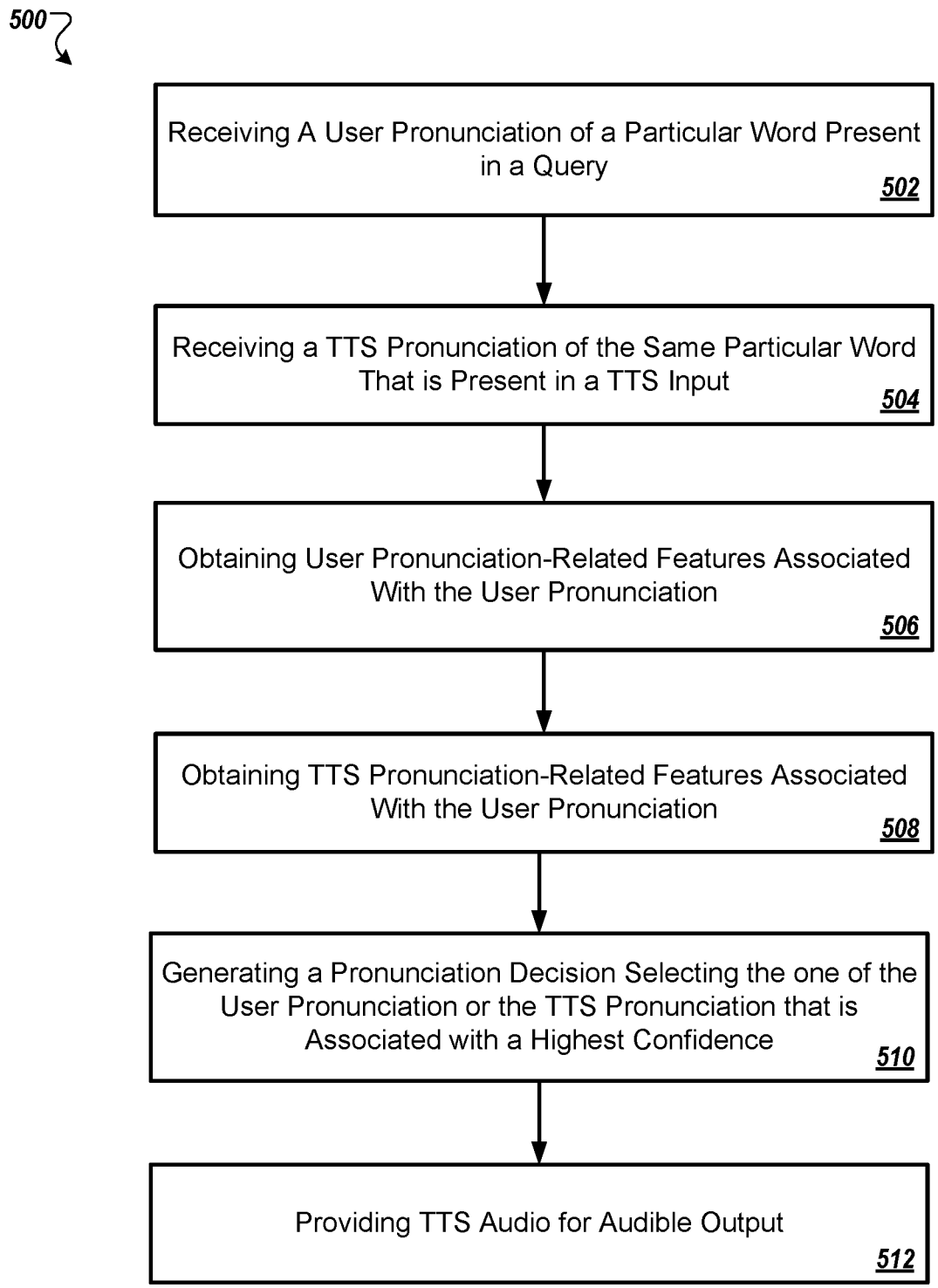
FIG. 5 is a flowchart of an example arrangement of operations for a method of instantaneous learning in text-to-speech during a dialog between a user and a digital assistant.

FIG. 5 is a flowchart of an example arrangement of operations for a method 500 of selecting one of a user pronunciation 202 or a different TTS pronunciation 204 of a word that is present in both a spoken query 12 and a TTS input 152 that includes a textual representation of a response to the query 12. At operation 502, the method 500 includes receiving a user pronunciation 202 of a particular word present in a query 12 spoken by a user 10. At operation 504, the method 500 includes receiving a TTS pronunciation 204 of the same particular word that is present in a TTS input 152. The TTS input 152 includes a textual representation of a response to the query 12 and the TTS pronunciation 204 of the particular word is different than the user pronunciation 202 of the particular word. At operation 506, the method 500 includes obtaining user pronunciation-related features 210 associated with the user pronunciation 202 of the particular word. At operation 508, the method 500 includes obtaining TTS pronunciation-related features 230 associated with the TTS pronunciation 204 of the particular word. At operation 510, the method 500 includes generating, as output from a pronunciation decision model 200 configured to receive the user pronunciation-related features 210 and the TTS pronunciation-related features 230 as input, a pronunciation decision 250 selecting the one of the user pronunciation 202 of the particular word or the TTS pronunciation 204 of the particular word that is associated with a highest confidence for use in TTS audio 154. At operation 512, the method 500 includes providing, for audible output from a user device 110 associated with the user 10, the TTS audio 154 that includes a synthesized speech representation of the response to the query 12 using the one of the user pronunciation 202 for the particular word or the TTS pronunciation 204 for the particular word that was selected by the pronunciation decision 250 output from the pronunciation decision model 200.

Figure 6:
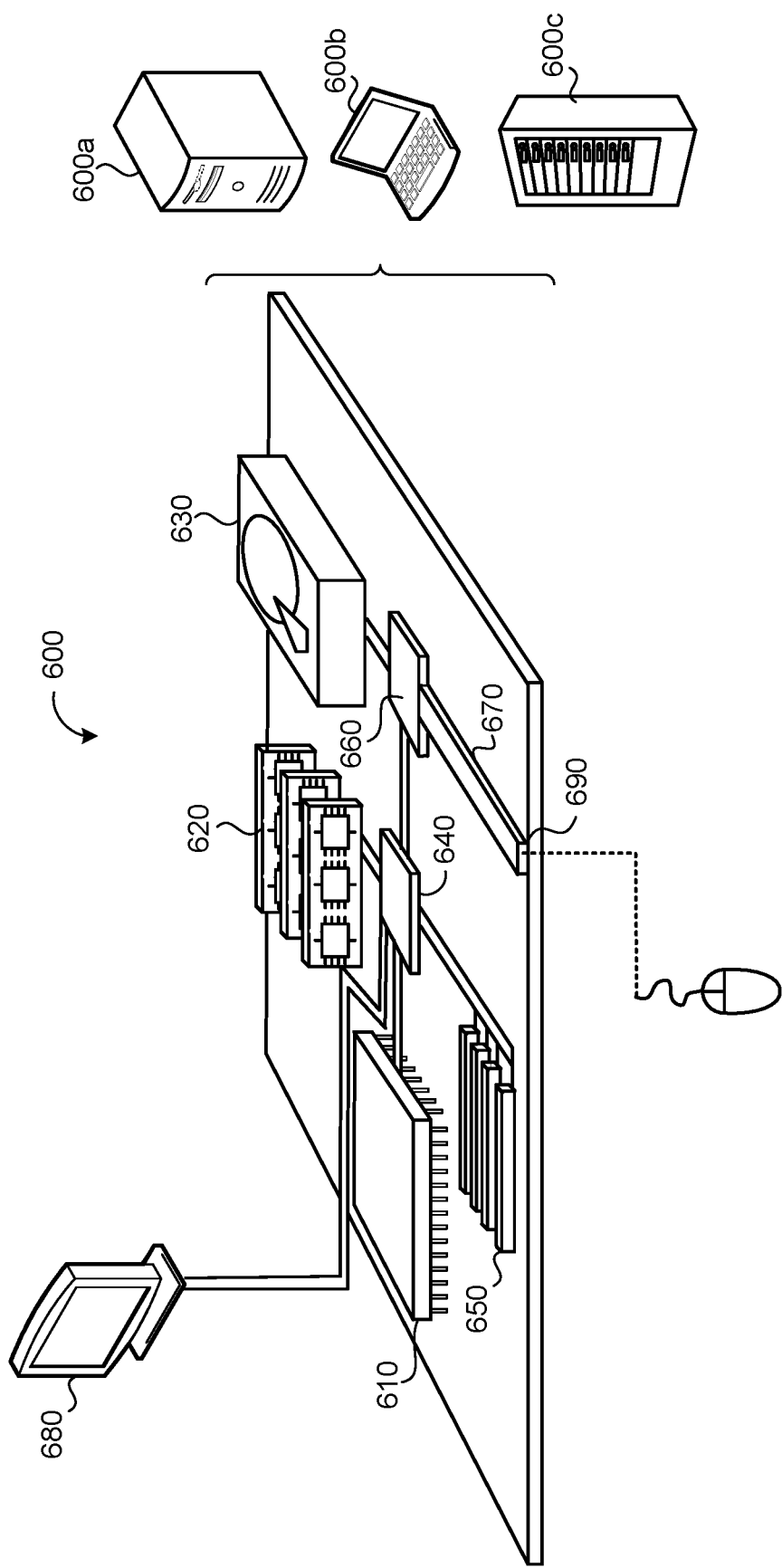
FIG. 6 is a schematic view of an example computing device that may be used to implement the systems and methods described herein.

FIG. 6 is schematic view of an example computing device 600 that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610, memory 620, a storage device 630, a high-speed interface/controller 640 connecting to the memory 620 and high-speed expansion ports 650, and a low speed interface/controller 660 connecting to a low speed bus 670 and a storage device 630. Each of the components 610, 620, 630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and a low-speed expansion port 690. The low-speed expansion port 690, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600a or multiple times in a group of such servers 600a, as a laptop computer 600b, or as part of a rack server system 600c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method executed on data processing hardware that causes the data processing hardware to perform operations comprising:
   processing, using a trained automatic speech recognition model, audio data representing a query spoken by a user to identify a particular word present in the query;
   receiving a user pronunciation of the particular word present in the query spoken by the user;
   receiving a text-to-speech (TTS) pronunciation of the same particular word, the TTS pronunciation of the particular word comprising a verified preferred pronunciation of the particular word that is verified by a person as being an accurate pronunciation of the particular word;
   determining, by processing the user pronunciation and the TTS pronunciation using a trained pronunciation decision model, that the verified preferred pronunciation of the particular word is different than the user pronunciation of the particular word;
   generating, using the trained pronunciation decision model, a pronunciation decision selecting the verified preferred pronunciation of the particular word, the pronunciation decision comprising:
      an indication for the user that the user pronunciation of the particular word is different from the verified preferred pronunciation of the particular word; and
      the verified preferred pronunciation of the particular word; and
   providing the pronunciation decision to a user device associated with the user.

2. The method of claim 1, wherein the operations further comprise, after receiving the TTS pronunciation of the same particular word:
   obtaining user pronunciation-related features associated with the user pronunciation of the particular word; and
   obtaining TTS pronunciation-related features associated with the TTS pronunciation of the particular word.

3. The method of claim 2, wherein selecting the verified preferred pronunciation of the particular word comprises determining that the verified preferred pronunciation of the particular word is associated with a highest confidence for use in TTS audio.

4. The method of claim 2, wherein the user pronunciation-related features associated with the user pronunciation of the particular word comprise at least one of:
   a geographical area of the user when the query was spoken by the user;
   linguistic demographic information associated with the user; or
   a frequency of using the user pronunciation when pronouncing the particular word in previous queries spoken by the user and/or other users.

5. The method of claim 2, wherein receiving the TTS pronunciation of the particular word comprises:
   receiving, as input to a trained TTS system, a TTS input comprising a textual representation of a response to the query;
   generating, as output from the trained TTS system, an initial sample of TTS audio comprising an initial synthesized speech representation of the response to the query; and
   extracting a TTS acoustic representation of the particular word from the initial sample of the TTS audio, the TTS acoustic representation conveying the TTS pronunciation of the particular word.

6. The method of claim 2, wherein receiving the TTS pronunciation of the particular word comprises processing a textual representation of a response to the query to generate a TTS phoneme representation that conveys the TTS pronunciation of the particular word.

7. The method of claim 1, wherein the operations further comprise:
receiving audio data corresponding to the query spoken by the user; and
processing, using an automated speech recognizer (ASR), the audio data to generate a transcription of the query.

8. The method of claim 7, wherein receiving the user pronunciation of the particular word comprises at least one of:
extracting the user pronunciation of the particular word from an intermittent state of the ASR while using the ASR to process the audio data;
extracting a user acoustic representation of the particular word from the audio data, the user acoustic representation conveying the user pronunciation of the particular word; or
processing the audio data to generate a user phoneme representation that conveys the user pronunciation of the particular word.

9. The method of claim 1, wherein the operations further comprise, after generating the pronunciation decision selecting the verified preferred pronunciation of the particular word:
receiving explicit feedback from the user indicating which one of the user pronunciation of the particular word or the TTS pronunciation of the particular word the user prefers for pronouncing the particular word in subsequent TTS outputs; and
updating the trained pronunciation decision model based on the explicit feedback from the user.

10. A system comprising:
data processing hardware; and
memory hardware in communication with the data processing hardware, the memory hardware storing instructions that, when executed on the data processing hardware, cause the data processing hardware to perform operations comprising:
processing, using an automatic speech recognition (ASR) model, audio data representing a query spoken by a user to identify a particular word present in the query;
receiving a user pronunciation of the particular word present in the query spoken by the user;
receiving a text-to-speech (TTS) pronunciation of the same particular word, the TTS pronunciation of the particular word comprising a verified preferred pronunciation of the particular word that is verified by a person as being an accurate pronunciation of the particular word;
determining, by processing the user pronunciation and the TTS pronunciation using a trained pronunciation decision model, that the verified preferred pronunciation of the particular word is different than the user pronunciation of the particular word;
generating, using the trained pronunciation decision model, a pronunciation decision selecting the verified preferred pronunciation of the particular word, the pronunciation decision comprising:
an indication for the user that the user pronunciation of the particular word is different from the verified preferred pronunciation of the particular word; and
the verified preferred pronunciation of the particular word; and
providing the pronunciation decision to a user device associated with the user.

11. The system of claim 10, wherein the operations further comprise, after receiving the TTS pronunciation of the same particular word:
obtaining user pronunciation-related features associated with the user pronunciation of the particular word; and
obtaining TTS pronunciation-related features associated with the TTS pronunciation of the particular word.

12. The system of claim 11, wherein selecting the verified preferred pronunciation of the particular word comprises determining that the verified preferred pronunciation of the particular word is associated with a highest confidence for use in TTS audio.

13. The system of claim 11, wherein the user pronunciation-related features associated with the user pronunciation of the particular word comprise at least one of:
a geographical area of the user when the query was spoken by the user;
linguistic demographic information associated with the user; or
a frequency of using the user pronunciation when pronouncing the particular word in previous queries spoken by the user and/or other users.

14. The system of claim 11, wherein receiving the TTS pronunciation of the particular word comprises:
receiving, as input to a trained TTS system, a TTS input comprising a textual representation of a response to the query;
generating, as output from the trained TTS system, an initial sample of TTS audio comprising an initial synthesized speech representation of the response to the query; and
extracting a TTS acoustic representation of the particular word from the initial sample of the TTS audio, the TTS acoustic representation conveying the TTS pronunciation of the particular word.

15. The system of claim 11, wherein receiving the TTS pronunciation of the particular word comprises processing a textual representation of a response to the query to generate a TTS phoneme representation that conveys the TTS pronunciation of the particular word.

16. The system of claim 10, wherein the operations further comprise:
receiving audio data corresponding to the query spoken by the user; and
processing, using an automated speech recognizer (ASR), the audio data to generate a transcription of the query.

17. The system of claim 16, wherein receiving the user pronunciation of the particular word comprises at least one of:
extracting the user pronunciation of the particular word from an intermittent state of the ASR while using the ASR to process the audio data;
extracting a user acoustic representation of the particular word from the audio data, the user acoustic representation conveying the user pronunciation of the particular word; or
processing the audio data to generate a user phoneme representation that conveys the user pronunciation of the particular word.

18. The system of claim 10, wherein the operations further comprise, after generating the pronunciation decision selecting the verified preferred pronunciation of the particular word:
receiving explicit feedback from the user indicating which one of the user pronunciation of the particular word or the TTS pronunciation of the particular word the user prefers for pronouncing the particular word in subsequent TTS outputs; and updating the pronunciation decision model based on the explicit feedback from the user.

* * * * *